Patented Oct. 30, 1934

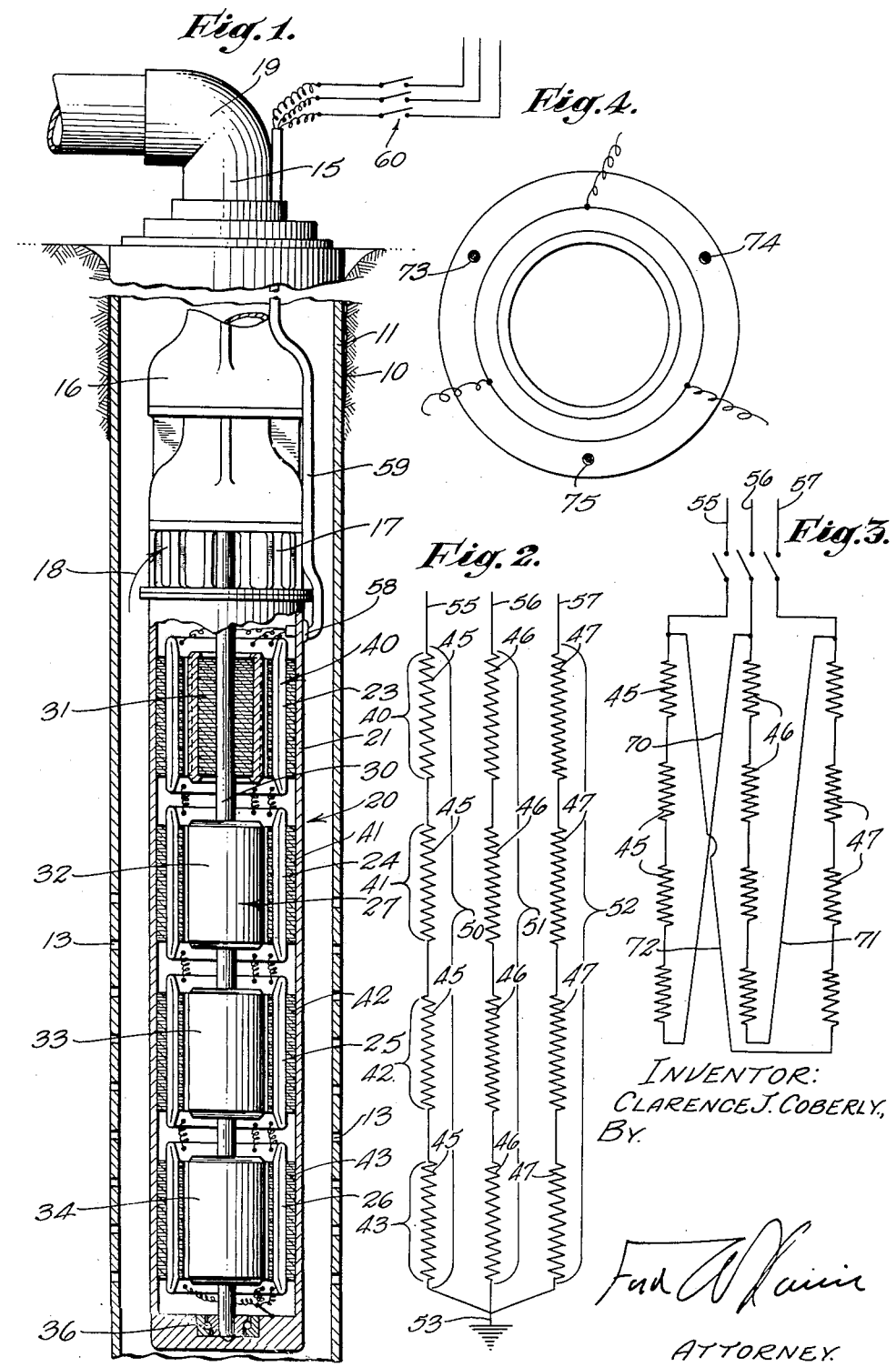

1,978,986

UNITED STATES PATENT OFFICE 1,978,986

MOTOR CONSTRUCTION

Clarence J. Coberly, Los Angeles, Calif., assignor to Submersible Motorpump Company, Ltd., Huntington Park, Calif., a corporation of California Application July 18, 1932, Serial No. 623,170

12 Claims. (Cl. 172—36)

My invention relates to electric motor structures, and more particularly to a novel motor-unit which finds particular utility in the deep-well pumping art and other arts wherein space considerations are important. It is in conjunction with the well pumping art that I will particularly describe my invention without in any way limiting myself thereto.

In pumping wells by the use of a turbine pump, it has been found desirable in most instances to directly connect the motor to the pump and lower the resulting structure as a unit into the well. Such a pumping structure eliminates the use of a long shaft which is otherwise necessary when the motor is positioned at the top of the well and the turbine pump is positioned near the bottom thereof, and also eliminates the large number of bearings necessary to journal such a shaft. Such a construction, however, necessitates a careful design of the electric motor in view of the limited space available in a majority of wells.

It is a primary object of this invention to provide an electric motor developing a large amount of power and occupying a minimum amount of space, especially in its transverse direction.

The size of the electric motor needed depends upon the capacity of the pump and the height to which the water must be pumped before reaching the surface of the ground. In large installations difficulty has been encountered in designing an electric motor which will produce the requisite power and still be small enough to occupy its allotted space in the well. Attempts have been made to utilize stators which are relatively long in longitudinal dimension with respect to their transverse dimension, but such a structure requires the use of extremely long stator slots in which the windings must be positioned, and makes the winding of such a stator extremely difficult. In addition, there is a greater tendency for the winding to become overheated in the central portion of the stator. I have found it possible to utilize a plurality of small superimposed stators, and to interconnect the windings of these stators in such a manner that the current reaching the lower stator windings passes through the uppermost stator winding, and it is an object of this invention to provide such a structure.

In a typical three-phase installation each stator winding is formed of three phase-windings, and it is an object of this invention to connect corresponding phase-windings of each stator in series with each other whereby current is supplied to each stator.

A further object of the invention lies in the provision of such a motor system in which those phase-windings thus connected in series are connected to each other near one end of the motor system.

A further object of the invention is to provide, as an article of manufacture, a stator including a plurality of phase-windings, the terminal portions of each phase-winding terminating at opposite ends of the stator.

Further objects and advantages of the invention will be made evident hereinafter.

In the drawing, I have diagrammatically shown two species of my invention. Referring to this drawing,—

Fig. 1 is a view partially in section showing a motor-pump unit incorporating the features of my invention.

Fig. 2 is a wiring diagram of the motor-unit shown in Fig. 1.

Fig. 3 is a wiring diagram of an alternative method of connection.

Fig. 4 is an end view of one of the stators when utilizing the method of connection shown in Fig. 3.

Referring particularly to Fig. 1, I have illustrated a well 10 in which a casing 11 has been set, the interior of this casing receiving water from the surrounding strata through suitable perforations 13.

Extending downward in the well is a discharge pipe 15 which supports a pump 16 at its lower end, this pump being usually in the form of a multi-stage turbine pump providing a perforated intake member 17 through which water or other well liquid is drawn as indicated by the arrow 18, this liquid rising through the discharge pipe and being discharged through an elbow 19 at the top of the ground.

The pump 16 is driven by a motor 20 positioned in a shell 21 which may be secured directly to the lower end of the intake member 17. In other instances the motor may be positioned above the pump 16 in a manner well known in the art.

The motor-unit itself is composed of a plurality of superimposed stators spaced vertically from each other in the shell 21, four of these stators being shown and being respectively numbered 23, 24, 25, and 26. Each of these stators has an external diameter slightly less than the internal diameter of the shell 21. Each of these stators comprises the usual laminated magnetic body with stator slots formed therein in the usual manner. A rotor means 27 is adapted to be driven by the stators, and, in the preferred form of the invention, includes a plurality of squirrel-cage rotors positioned in superimposed relationship upon a shaft 30, which is directly connected to the runners of the pump 16, the rotors being respectively numbered 31, 32, 33, and 34. This shaft is journalled in a bearing indicated by the numeral 36, and is sealed with respect to the upper end of the shell 21 by a suitable seal, not shown, this seal preventing entrance of water into the interior of the shell, it being usually preferable to maintain the space in this shell substantially filled with a material having a high dielectric strength such, for instance, as transformer oil.

Each of the stators 23, 24, 25, and 26 is provided with a stator winding, and one of the important features of this invention is the manner in which this winding is connected to adjacent stator windings. Referring particularly to Fig. 2, I have indicated these stator windings in general by the numerals 40, 41, 42, and 43. Each of these windings is, in the preferred form of the invention, composed of three individual phase-windings indicated respectively by the numerals 45, 46, and 47 and respectively termed primary, secondary, and tertiary phase-windings. The terminal portions of each of these phase-windings extend from opposite ends of the stator, so that one terminal portion extends above the stator, and the other terminal portion extends below this stator.

As best shown in Fig. 2 all of the primary phase-windings 45 of the stator windings 40, 41, 42, and 43 are connected together in series to form a primary series indicated by the numeral 50, this being accomplished by connecting the lowermost terminal portion of each phase-winding to the uppermost terminal portion of the phase-winding immediately therebelow, this being accomplished by any suitable connecting means such as a wire or other conductor. Similarly, all of the secondary phase-windings 46 are connected together in series to form a secondary series 51, while all of the tertiary phase-windings 47 are connected together in series to form a tertiary series 52. The lowermost terminal portions of the lowermost phase-windings 45, 46, and 47 are connected together and preferably grounded to the shell 21 as indicated by the numeral 53.

This method of connection connects the primary, secondary, and tertiary series 50, 51, and 52 in Y, each leg of the Y containing a plurality of phase-windings in series. The ends of the Y (or, in other words, the upper terminal portions of the uppermost phase windings 45, 46, and 47) are connected to a three-phase supply system providing conductors 55, 56, and 57 which pass through a suitable junction box 58 of the shell 21 and extend upward to the surface of the ground and to a switch 60 adapted to energize these conductors.

It is thus apparent that the current reaching the lowermost stator windings must pass through those stator windings thereabove, and one of the most important advantages of this system is due to the elimination of any conductors extending downward through the upper stators, aside from the conductors which are actually effective in setting up the flux which in turn turns the rotor. If, for instance, the stator windings were to be connected in parallel with a common bus system, it would be necessary for this bus system to extend through the upper stators, thus taking up very valuable space and changing the magnetic characteristics of the stator in the event that these supply busses are positioned in holes or other depressions cut in the surface of the stators.

In following out the teachings of the preferred embodiment of the invention, it is usually preferable to utilize stator windings having conductors which are slightly larger in diameter than the usual stator windings for this size of magnetic body in view of the larger current which passes therethrough. However, the number of turns can be correspondingly decreased due to this increased current, the net result being a distinct saving in space.

It is not in all instances necessary to connect the primary, secondary, and tertiary series 50, 51, and 52 in Y. Thus, in Fig. 3 I have shown these series as being connected in delta, this being accomplished by connecting the lowermost phase-winding 45 of the primary series to the uppermost phase-winding 46 of the secondary series by means of a conductor 70. Similarly, a conductor 71 connects the lower and upper portions of the secondary and tertiary series 51 and 52 respectively, while a conductor 72 respectively connects the lower and upper terminal portions of the tertiary and primary series 52 and 50. This embodiment of the invention necessitates the provision of space adjacent the stators for carrying the conductors 70, 71, and 72, but in view of the fact that these conductors carry only a fractional part of the current flowing in the supply lines 55, 56, and 57 it is at once apparent that smaller conductors can be used than would be possible if the stator windings were connected in parallel to a bus system which extended through these stators. It will thus be apparent that this system also results in an economy of space considerations. As shown in Fig. 4, the conductors 70, 71, and 72 may extend upward through openings 73, 74, and 75 formed in the magnetic body of the stator, these openings usually being too small to detrimentally affect the magnetic characteristics of the stator.

Other systems of connection are also possible and will be apparent to those skilled in the art. In this connection, it should be understood that the showing herein is only diagrammatic, and further that the principles herein set forth are applicable to numerous motor installations where space considerations are important and not alone to a combination including a submerged pump. So also, I am, of course, not limited to any particular number of phases, for either a single phase system, or a multi-phase system might be used. Finally, while I have shown and described the stator units as being vertically superimposed, it should be understood that these terms are only relative, and that the terms upper and lower have been used for the purpose of distinction rather than limitation.

I claim as my invention:

1. In combination in a motor-unit adapted to be positioned in a well of limited diameter: a shell; a plurality of stators in superimposed relationship in said shell, each stator providing a stator winding; means for connecting said stator windings together in such a manner that the current reaching the lower stator windings must pass through the uppermost stator winding; a rotor means adjacent said stators; and a rotatably mounted shaft to which said rotor means is secured.

2. In combination in a motor-unit adapted to be positioned in a well of limited diameter: a shell; a plurality of stators in superimposed relationship in said shell, each providing a stator winding having upper and lower terminal portions; connecting means for connecting the lower terminal portion of each stator winding to the upper terminal portion of the stator winding immediately therebelow; means connected to the upper terminal portions of the uppermost of said stator windings for supplying current thereto, said current flowing through said connecting means to the stator windings therebelow; and rotor means operably associated with said stators.

3. In combination in a motor-unit adapted for use in a small-diameter well: a plurality of stators mounted in superimposed relationship; a stator winding associated with each of said stators, each stator winding comprising primary, secondary, and tertiary phase-windings; connecting means for connecting the primary phase-windings of all of said stators in series with each other to form a primary series, and for connecting the secondary phase-windings of all of said stators in series with each other to form a secondary series, and for connecting the tertiary phase-windings of all of said stators in series with each other to form a tertiary series; means for connecting the ends of said primary, secondary, and tertiary series together; means for supplying a polyphase current to the uppermost terminal portions of said primary, secondary, and tertiary series; and rotor means associated with said stators in a manner to be rotated by the current passing through said stator windings.

4. In combination in a motor-unit adapted for use in a small-diameter well: a plurality of stators mounted in superimposed relationship; a stator winding associated with each of said stators, each stator winding comprising primary, secondary, and tertiary phase-windings; connecting means for connecting the primary phase-windings of all of said stators in series with each other to form a primary series, and for connecting the secondary phase-windings of all of said stators in series with each other to form a secondary series, and for connecting the tertiary phase-windings of all of said stators in series with each other to form a tertiary series; means for connecting the primary, secondary, and tertiary series together adjacent the lowermost stator whereby said series are connected in Y; supply means for supplying a polyphase current to the uppermost terminal portions of said primary, secondary, and tertiary series; and rotor means associated with said stators in a manner to be rotated by the current passing through said stator windings.

5. A combination as defined in claim 4 in which said supply means is Y-connected with the neutral point electrically connected to said shell, and in which said means for connecting the primary, secondary, and tertiary series together in Y includes conductor means thereadjacent for electrically connecting the neutral point of this Y-connection to said shell.

6. In combination in a motor-unit adapted for use in a well: a shell providing an imperforate wall of cylindrical shape; a plurality of relatively short stators positioned in superimposed relationship in said imperforate wall, each stator including a magnetic body and a winding therein and providing upper and lower end portions extending a distance from the upper and lower ends of said magnetic body, each end portion including a terminal means, said stators being spaced from each other a distance greater than the combined distances said end portions of said windings extend from adjacent magnetic bodies to define spaces between said adjacent magnetic bodies which spaces contain said end portions; connecting means in said spaces for connecting together corresponding terminal portions of said end portions positioned in said spaces; and a rotor means rotatably mounted adjacent said stators to be rotated thereby.

7. A combination as defined in claim 6 in which the external diameter of each of said stators is only slightly less than the internal diameter of said imperforate wall whereby heat is conducted from said magnetic bodies to and through said imperforate wall to the exterior thereof.

8. In combination in a motor-unit adapted for use in a small-diameter well: a shell; a plurality of stators positioned in said shell in superimposed relation, each stator providing a winding with upper and lower terminal portions; means for connecting corresponding upper and lower terminal portions of adjacent windings together to connect said windings in series; supply means electrically connected to the uppermost stator winding and to said shell; conductor means connecting the lower terminal portion of the lowermost stator winding to said shell; and a rotatably mounted rotor means adjacent said stators.

9. In combination in a motor-unit adapted to be positioned in a well of limited diameter: a shell; a plurality of stators in superimposed relationship in said shell, each providing a stator winding having upper and lower terminal portions; connecting means for connecting the lower terminal portion of each stator winding to the upper terminal portion of the stator winding immediately therebelow; means connected to the upper terminal portions of the uppermost of said stator windings for supplying current thereto, said current flowing through said connecting means to the stator windings therebelow; and individual rotor means operably associated with each of said stators.

10. In combination in a motor-unit adapted for use in a small-diameter well: a shell; a plurality of stators positioned in superimposed relationship in said shell, each stator providing a winding having upper and lower terminal portions; means for connecting corresponding upper and lower terminal portions of adjacent windings together to connect said windings in series; supply means electrically connected to the uppermost stator winding and to said shell; conductor means connecting the lower terminal portion of the lowermost stator winding to said shell; a rotatable shaft; and a plurality of separate rotors mounted on said shaft, each of said rotors being positioned adjacent to one of said stators to be rotated thereby.

11. In combination in a motor-unit adapted for use in a small-diameter well: a shell; a plurality of stators positioned in superimposed relationship in said shell, each of said stators having a length approximately equal to its diameter, each stator providing a winding having upper and lower terminal portions; means for connecting corresponding upper and lower terminal portions of adjacent windings together to connect said windings in series; supply means electrically connected to the uppermost stator winding and to said shell; conductor means connecting the lower terminal portion of the lowermost stator winding to said shell; a rotatable shaft; and a plurality of separate rotors mounted on said shaft, each of said rotors being positioned adjacent to one of said stators to be rotated thereby.

12. In combination in a motor-unit adapted for use in a small-diameter well: a shell; a plurality of stators positioned in superimposed relationship in said shell, each of said stators having a length approximately equal to its diameter, each stator providing a stator winding; means for connecting said stator windings together in such a manner that the current reaching the lower stator windings must pass through the uppermost stator windings; a rotatable shaft; and a plurality of separate rotors mounted on said shaft, each of said rotors being positioned adjacent one of said stators to be rotated thereby.

CLARENCE J. COBERLY.